United States Patent

Anderson et al.

[15] 3,637,954

[45] Jan. 25, 1972

[54] METHOD AND APPARATUS FOR DYNAMIC TESTING OF ECHO SUPPRESSORS IN TELEPHONE TRUNK SYSTEMS

[72] Inventors: Theodore C. Anderson; Roger D. Baum, both of Middletown; David L. Favin, Little Silver; John J. Rugo, Middletown, all of N.J.

[73] Assignee: Bell Telephone Laboratories, Incorporated, Murray Hill, Berkeley Heights, N.J.

[22] Filed: May 22, 1969

[21] Appl. No.: 826,893

[52] U.S. Cl. ....................179/175.31E

[51] Int. Cl. ....................H04b 3/46, H04b 3/20

[58] Field of Search ....................179/175.31 E, 175.31 R

[56] References Cited

UNITED STATES PATENTS

| | | | |
|---|---|---|---|
| 1,560,544 | 11/1925 | Crisson | 179/175.31 |
| 2,006,698 | 7/1935 | Peterson | 179/175.31 |
| 2,152,709 | 4/1939 | Schott | 179/175.31 |
| 3,497,641 | 2/1970 | Helder et al. | 179/175.31 E |

*Primary Examiner*—Kathleen H. Claffy
*Assistant Examiner*—Douglas W. Olms
*Attorney*—R. J. Guenther and William L. Keefauver

[57] ABSTRACT

Functional characteristics of echo suppressors in a telephone truck system are dynamically evaluated by propagating selected test signals, in a predetermined format tailored to the characteristic being evaluated, through the trunk system and selectively through echo suppressors in the system. An auxiliary trunk is utilized in conjunction with the trunk-under-test to facilitate transmission and reception of the test signals. Test signals are supplied from and evaluated by a master test unit, which is preprogrammed in accordance with the test being performed and the type echo suppressor being evaluated.

22 Claims, 21 Drawing Figures

INVENTORS T.C. ANDERSON, R.D. BAUM
D.L. FAVIN, J.J. RUGO
BY
A. E. Hirsch Jr.
ATTORNEY

TRANSMITTER 111

METHOD AND APPARATUS FOR DYNAMIC TESTING OF ECHO SUPPRESSORS IN TELEPHONE TRUNK SYSTEMS

BACKGROUND OF THE INVENTION

This invention relates to telephone transmission test methods and equipment and, more particularly, to a test method and equipment for evaluating echo suppressor operation in a transmission path.

Many telephone messages and the like are transmitted over circuit connections involving long distances. Because of irregularities in the telephone facilities utilized in making these connections, reflected or echo signals may be generated. Echo signals become a problem, disturbing transmission quality, when there is a round-trip delay of more than a few milliseconds in the transmission circuit. In typical circuits, signal delays of a few to several hundred milliseconds may be encountered.

Echo suppressors are generally used to eliminate or minimize the effects of echo disturbances. Since most long-distance telephone connections involve circuits which use echo suppressors, transmission quality may be affected by variations in the operating characteristics of the individual echo suppressors. Maintenance of a modern telephone system thus requires periodic testing of echo suppressors to assure trouble-free, high-quality service.

In general, faulty echo suppressor operation degrades the quality of speech transmission. For example, an echo signal may be returned to a subscriber, because of a delay in echo suppressor operation, making the speech signal received by him incomprehensible. Speech mutilation or chopping may result during a "double-talking" interval, i.e., when two subscribers are talking at the same time, because an echo suppressor fails to yield instantaneously in providing a transmission path to a second one of the talking parties. Errors in data transmitted over telephone lines may occur because echo suppressors in the transmission lines have not been disabled.

Heretofore, echo suppressor operation was evaluated by either of two methods. In one method, the echo suppressor to be tested is electrically removed from service. This type of testing is cumbersome, time consuming and inconclusive. It does not provide any information concerning the in-circuit operation of the unit. Hopefully, a suppressor is properly connected into the transmission path after testing. It has been found that this is not always the rule. Indeed, after it has been determined that an echo suppressor is functioning properly in a static test environment, it is still not determined whether it functions properly in the transmission path in which it is to be used.

The second test method involves testing by so-called experts. These experts attempt to evaluate the echo suppressors by merely talking to one another over the transmission path under test and listening to the received signals. Such a test procedure is costly because of its dependence on skilled technicians at both the near and far ends of the telephone trunk under test. Moreover, the results obtained are not quantitative, and they are always suspect because of external influences on the individuals making such highly subjective tests. These tests have also proved to be inconclusive in practice.

It is therefore a general object of the invention to test objectively echo suppressor operation in telephone transmission systems.

Another object of the invention is to obtain automatically measures of selected functional characteristics of each of the individual echo suppressors in a transmission path.

SUMMARY OF THE INVENTION

These objects and other advantages are achieved in accordance with the inventive principles described herein for dynamically testing individual ones of echo suppressors in a telephone trunk system. In accordance with the invention selected ones of a plurality of signals in a predetermined format are propagated through the trunk system and selectively through the particular echo suppressor under test. Operational characteristics of the echo suppressor or suppressors under test are automatically determined by evaluation of the test signals which have been propagated through the test system in accordance with preselected test functions assigned to each of the test signals.

More specifically, a circuit for dynamically testing echo suppressors in a telephone trunk system is established by connecting a first telephone transmission trunk, i.e., a test trunk, including echo suppressors to be tested, to a second telephone trunk, i.e., an auxiliary trunk, via a loop-around unit. The test trunk may include echo suppressors both at the near-end and the far-end. Similarly, the auxiliary trunk may also include echo suppressors at the near-end and the far-end. Echo suppressors in the auxiliary trunk are disabled so that a proper determination of the operational characteristics of the echo suppressors in the test trunk is made. A plurality of selected test signals are generated in a transmitter and supplied in a predetermined format to the near-end or far-end echo suppressor, whichever is to be tested via the test trunk or auxiliary trunk, as required. The transmitted test signals are generated at predetermined frequencies and for predetermined intervals in accordance with the functional characteristic or characteristics to be tested. These signals should cause the echo suppressor, or suppressors, under test to react in a specific predetermined manner. Whether the echo suppressor under test properly reacts and, therefore, is functioning properly, is determined automatically in a receiver by evaluating the received test signals in accordance with predetermined test functions assigned to the individual transmitted test signals.

Accordingly, the echo suppressors in telephone trunks interconnecting a first central office to a plurality of other central offices may be evaluated entirely by tests initiated and completed at the first office with a need only for minimal equipment at the other central offices.

These and other objects and advantages of the invention will be more fully understood from the following detailed description of the invention taken in accordance with the appended drawings.

DETAILED DESCRIPTION

Figure 1:
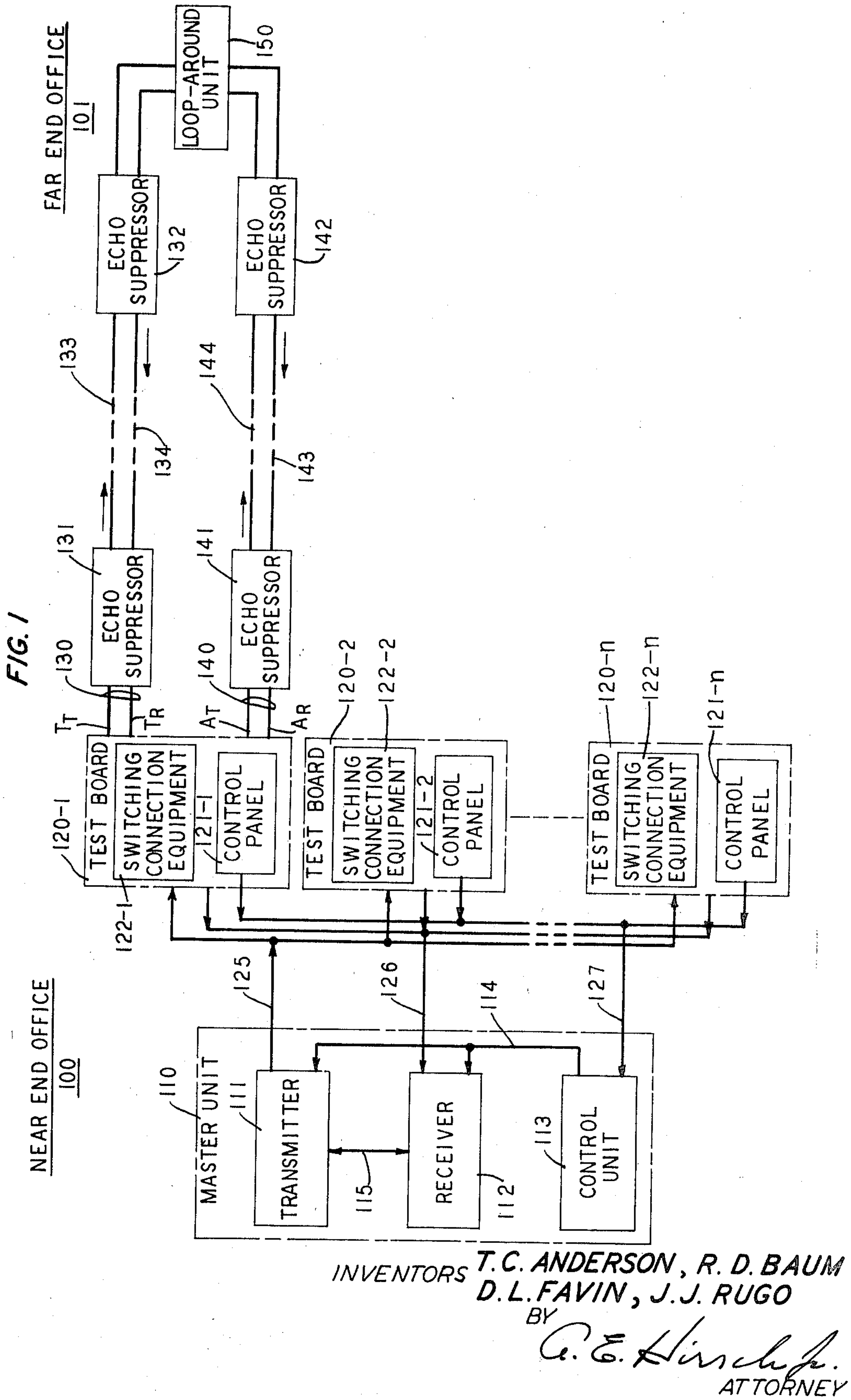
FIG. 1 depicts an arrangement in accordance with the invention, for testing the performance of a telephone circuit.

FIG. 1 depicts in simplified block schematic form, a test system which illustrates the principles of this invention. Since the invention is concerned with the testing of echo suppressors in transmission paths connecting a first telephone office to a plurality of second or remote offices, two office locations, 100 and 101, are shown for purposes of illustration in the figure. For simplicity and clarity of description, the connections between the functional blocks of the illustrated system are shown as single conductors. In practice, however, these connections may include a plurality of conductors. Telephone switching equipment and other auxiliary testing equipment associated with offices 100 and 101 are not shown.

Near-end office 100 includes all of the equipment necessary for initiating and completing the testing of echo suppressors in a transmission path. That is to say, echo suppressors located in the transmission path both at near-end office 100 and far-end office 101 may be evaluated entirely from office 100. Far-end office 101 includes all of the equipment necessary to facilitate testing of the telephone trunks interconnecting it with office 100.

Figure 2:
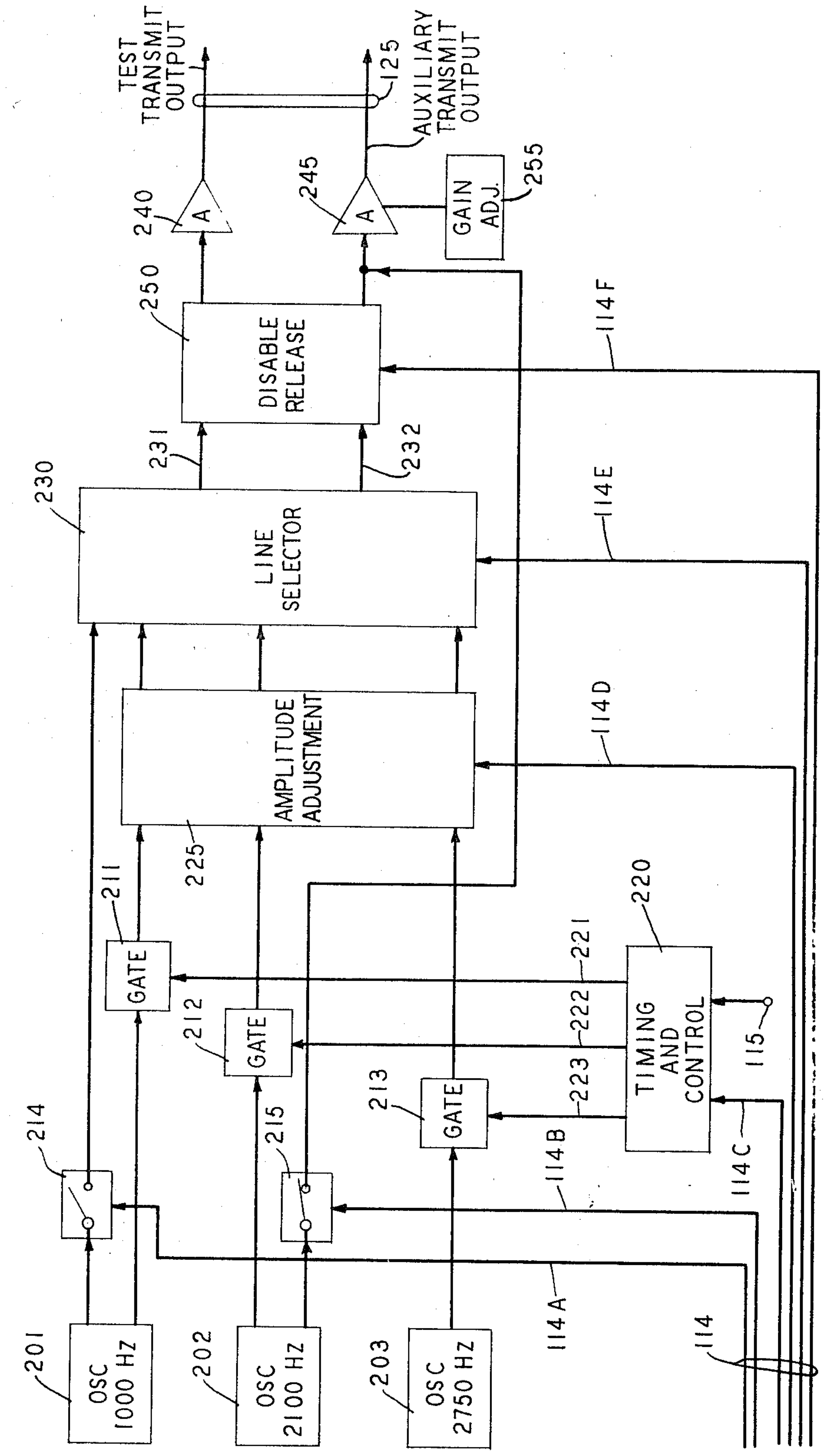
FIG. 2 shows in simplified block schematic form details of the transmitter of FIG. 1.
Figure 3:
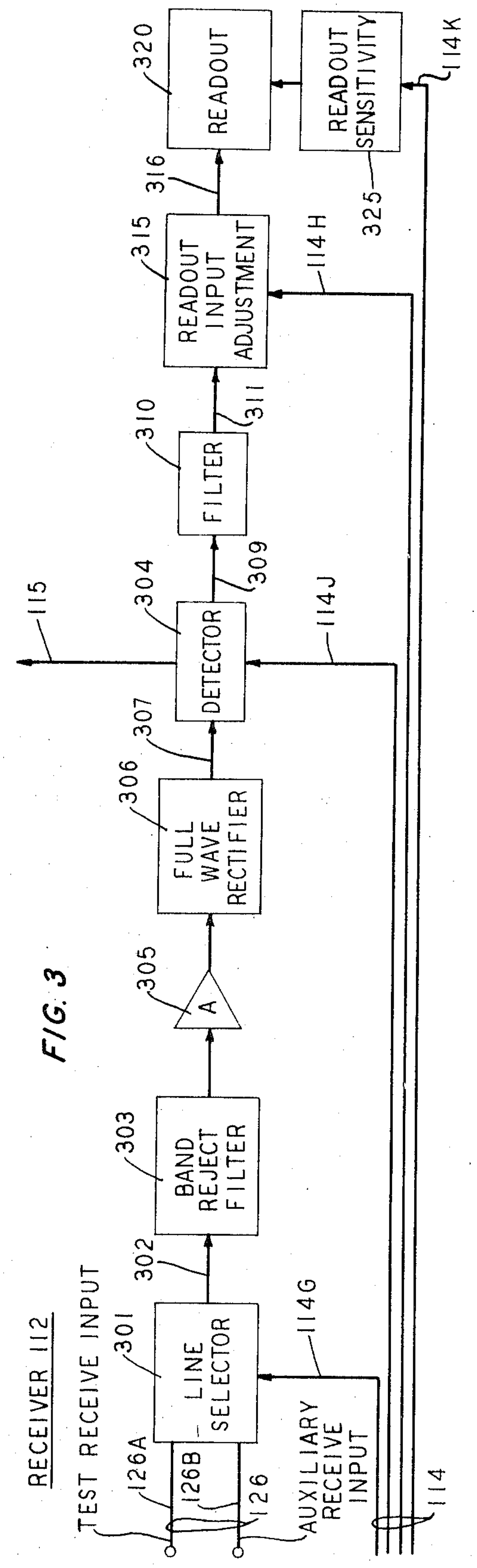
FIG. 3 depicts in block schematic form details of the receiver of FIG. 1.

Accordingly, near-end office 100 includes master test unit 110 and a plurality of testboards 120-1 through **120-*n*. Master unit 110 includes transmitter 111, receiver 112 and control unit 113. Transmitter 111 generates a plurality of test signals which are tailored to the particular test or tests to be performed. Details of transmitter 111 are shown in FIG. 2 and will be discussed later. Receiver 112 receives and processes test signals which have propagated through the test system and selectively through the echo suppressor or suppressors under test. Receiver 112 is directly interconnected with transmitter 111 via circuit path 115 for particular tests. Details of receiver 112 are depicted in FIG. 3 and will be explained below. Control unit 113, as the name implies, controls the functions of transmitter 111 and receiver 112 for the particular tests which are being performed. Although control unit 113 is shown as supplying signals to transmitter 111 and receiver 112 via circuit path 114**, in practice the control functions may be achieved by utilizing a plurality of relays or other switching devices included in the transmitter and receiving units.

Transmitter 111, receiver 112 and control unit 113 of master test unit 110 are connected to testboards 120-1 through **120-*n* via circuit paths 125, 126 and 127, respectively. Each of testboards 120-1 through 120-*n* may be of a type well known in the telephone art, and each is associated with a telephone trunk group that interconnects near-end office 100** with a far-end office. Maximum economy is realized in such a system because only one master test unit is needed per telephone office location. The number of testboards per office is determined by the number of trunk groups in the office.

Figure 4:
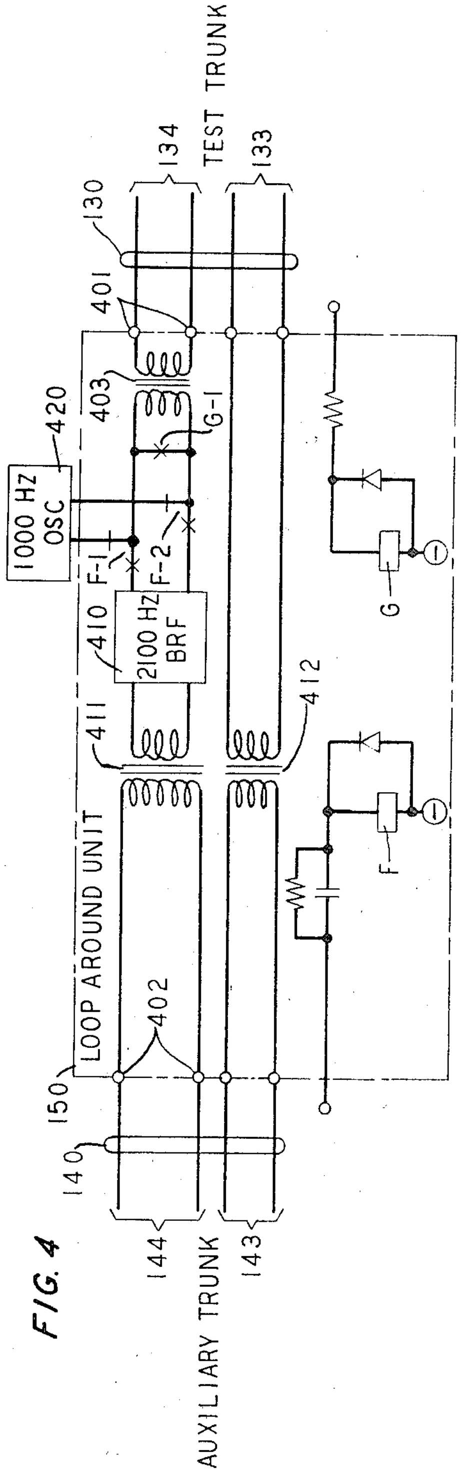
FIG. 4 shows in schematic form details of the loop-around unit of FIG. 1.

For purposes of illustrating the invention in this example, near-end office 100 is interconnected through testboard 120-1 via "test" telephone trunk 130 and "auxiliary" telephone trunk 140 to far-end office 101. Test trunk 130 and auxiliary trunk 140 are connected in far-end office 101 via loop-around unit 150 to complete a test circuit. This is accomplished by utilizing switching connection equipment 122-1 which, as is known in the art, is associated with testboard 120-1. Thus, the interconnection of trunks 130 and 140 is effected, in well known manner by "dialing" a special test code over the respective trunks. The use of auxiliary trunk 140 in the test circuit of the present invention greatly simplifies both the test procedure and the test system. Trunk 140 provides an additional path which facilitates the transmission and reception of test signals to and from, respectively, the particular echo suppressors under test. Only a minimum of equipment is needed in far-end office 101, namely loop-around unit 150. Details of loop-around unit 150 are shown in FIG. 4.

Test trunk 130 may include echo suppressors 131 and 132 at its near-end and far-end, respectively. Generally, telephone trunks utilized to interconnect telephone switching offices are four-wire facilities. Thus, test trunk 130 further includes a two-wire outgoing path 133, customarily referred to as the transmit path and a two-wire incoming path 134, customarily referred to as the receive path. Portions of the transmission media of trunk 130 may also include a submarine cable or synchronous satellite. Similarly, auxiliary trunk 140 may include echo suppressors 141 and 142, and transmit and receive paths 143 and 144, respectively.

Control panels 121-1 through **121-*n* are associated with testboards 120-1 through 120-*n*, respectively. Control panels 121 may be of a type which are utilized for activating master unit 110. In general, such a panel has a plurality of push buttons which are used in selecting specific tests to be performed on selected echo suppressors known to be in the trunk under test. Control panels 121** may also be of a type which are adapted for automatic testing of the telephone trunks. For example, they may respond to a tape or other preestablished program for automatically cycling through the format of tests of the present invention.

Turning to FIG. 2, there is shown, in block schematic form, the details of transmitter 111. Oscillators 201, 202 and 203, which may be any of the numerous types known in the art, generate signals, for example, at 1,000 Hz., 2,100 Hz., and 2,750 Hz., respectively. Preferably, these signal frequencies are utilized because, as is known in the echo suppressor art, typical echo suppressors respond to them in a preestablished manner. Switching elements 214 and 215 and transmission gates 211, 212 and 213 are utilized in conjunction with oscillators 201, 202 and 203 to develop particular signal formats, as desired. Switching devices 214 and 215 are activated from control unit 113 (FIG. 1) via circuit paths 114A and 114B, respectively. For purposes of explanation, circuit path 114 is shown as a plurality of conductors which supply signals to the respective networks. In practice, however, switching devices 214 and 215 may be, for example, relay contacts. Transmission gates 211, 212 and 213 which may be any of those well known in the art, are controlled in a predetermined manner by signals supplied from timing and control unit 220 via circuit paths 221, 222 and 223, respectively. The form and duration of the control signals generated in timing and control unit 220 vary in accordance with the specific test or tests being performed. Timing and control unit 220 is controlled by signals supplied from control unit 113 (FIG. 1) via circuit path 114C. Details of timing and control unit 220 are shown in FIG. 5.

Figure 7:
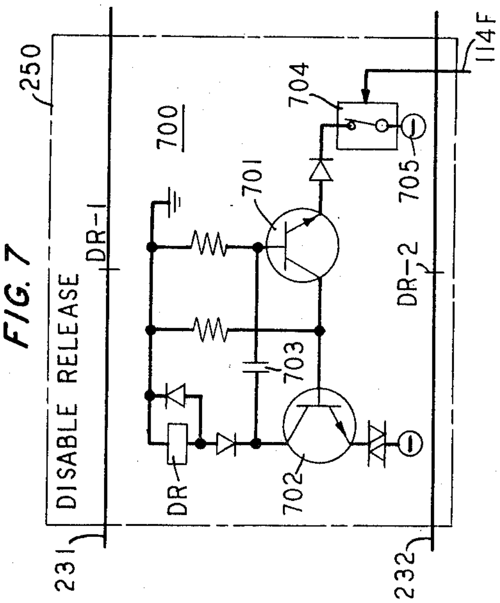
FIG. 7 depicts in schematic form details of the disable release unit of FIG. 2.

The gated oscillator signals are supplied to adjustment network 225 where their amplitudes are adjusted as required. Signals supplied through switching devices 214 and 215 are utilized for specific test functions to be discussed later in relation to the test procedures. Amplitude adjustment network 225 may be, for example, a voltage divider network which is manipulated, in a well-known manner, utilizing relays or the like, to obtain signals having particular amplitudes in accordance with the test functions to be performed. The signals developed at the outputs of amplitude adjustment network 225 are supplied to line selector 230 where they are selectively routed either to circuit connection 231 or 232, as desired. Line selector 230 may also be of a type well known in the art. Typically, a plurality of controlled relays is utilized in a well known fashion to make the proper circuit path selection. The routed signals are supplied to test transmit output amplifier 240 or to auxiliary transmit output amplifier 245 via disable release network 250. Details of the disable release network are shown in FIG. 7 and will be discussed later. Amplifiers 240 and 245 may be any of the numerous ones well known in the art. Auxiliary output amplifier 245 is provided with gain adjustment 255 which is utilized during calibration of the test system. Signals developed at the output of amplifier 240 and signals developed at the output of amplifier 245 are supplied via circuit path 125 for use as desired.

Figure 5:
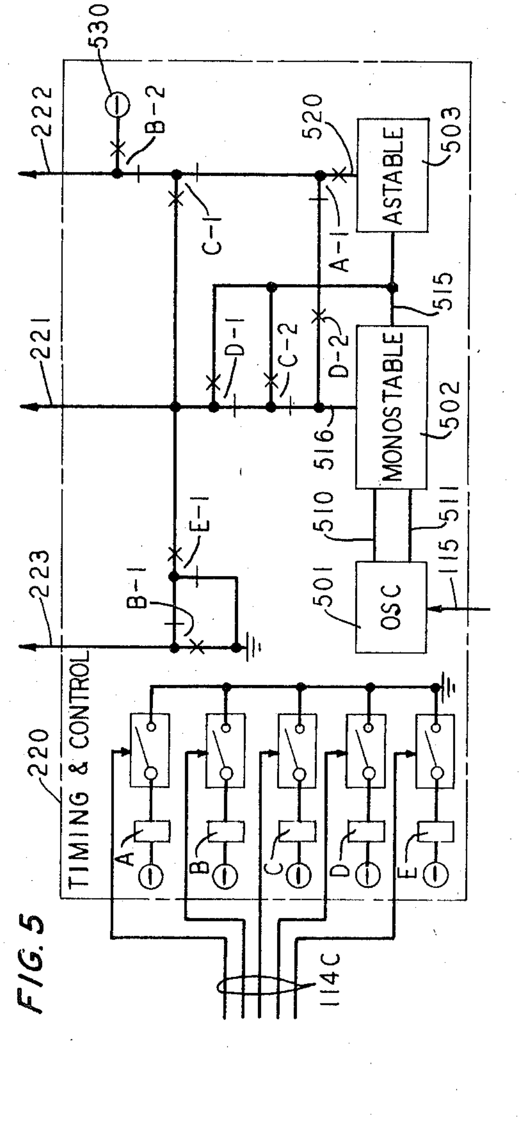
FIG. 5 shows details of the timing and control unit of FIG. 2.
Figure 6:
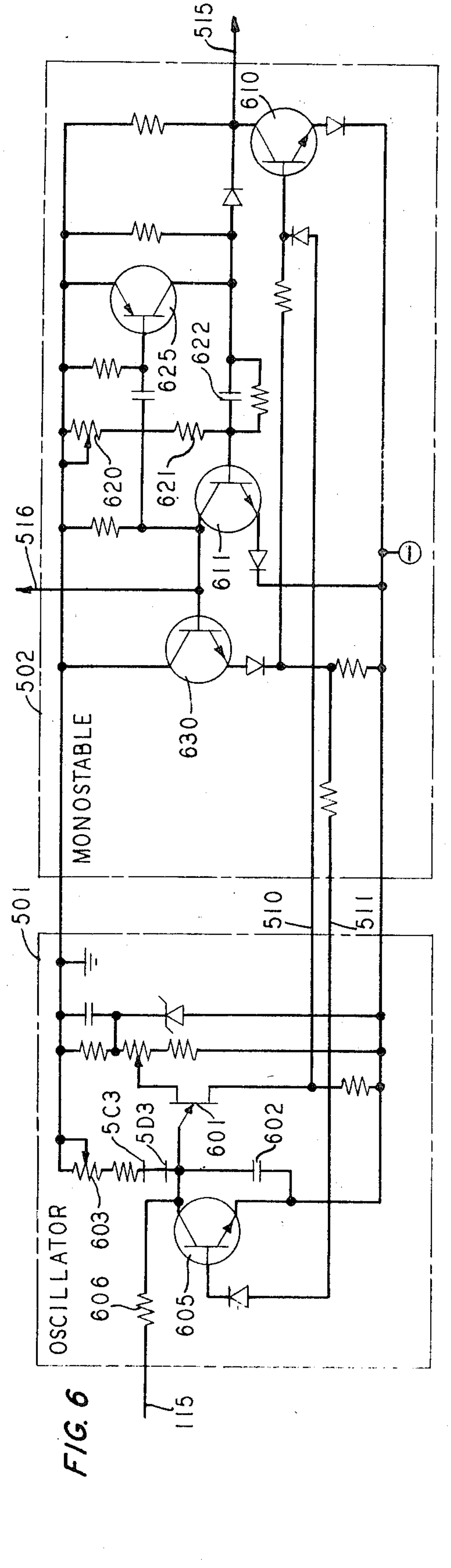
FIG. 6 shows in schematic form the oscillator and monostable units of FIG. 5.

FIG. 5 shows in simplified form the details of timing and control unit 220. Oscillator 501 is associated with monostable multivibrator 502 to develop timing signals having predetermined duty cycles at monostable outputs 515 and 516. Details of oscillator 501 and monostable 502 are shown in FIG. 6. Signals developed at outputs 515 and 516 of monostable 502 are complementary, i.e., the signal developed at output 515 is normally "high" or a logic "1," and the signal developed at output 516 is normally "low" or a logic "0." Output signals developed at 515 are supplied to astable multivibrator 503 for developing timing signals at astable output 520 which conform to predetermined waveforms. Astable 503 is responsive to function only during those intervals when the signal condition developed at output 515 of monostable 502 is a "low" or a logic "0." Since the signal condition at 515 is normally high, astable 503 functions only when monostable 502 is in its unstable mode of operation. Said another way, astable 503 functions to develop a signal at its output 520 only when monostable 502 is cycling through its astable interval. Thus, a plurality of timing signals are available to be supplied to circuit paths 221, 222 and 223 and hence to transmission gates 211, 212 and 213, respectively (FIG. 2). Accordingly, signals developed at 515, 516 and 520 may be supplied as required to circuit paths 221, 222 and 223 by activating, individually or in combination, relays A through E. The circuit paths for conducting the signals developed at 515, 516 and 520 are determined by the contacts of the relays so activated. For example, signals developed at output 516 of monostable 502 are supplied to circuit path 221 via the 2 break of C and the 1 break of D without activating any of the relays. If the same signals, that is, those developed at output 516, are to be supplied to circuit path 222, relay D is activated and the signals are supplied from 516 via the 2 make of D, the 1 break of A, the 1 break of C and the 2 break of B. Similarly, signals developed at the other outputs may be routed to each of circuit paths, 221, 222 and 223 as desired.

FIG. 6 depicts details of an oscillator-monostable multivibrator combination which may be utilized in timing and control unit 220 shown in FIG. 5. Oscillator 501 and monostable 502 form an astable multivibrator having variable duty cycle capabilities. The astable multivibrator so formed provides independent control over the pulse width interval and the period interval and also provides very low duty cycle operation. Basically, oscillator 501 is a unijunction transistor oscillator comprising the normal unijunction transistor 601, timing capacitor 602, frequency adjusting potentiometer 603 and other biasing resistors. Transistor 605 shunting capacitor 602 is utilized to maintain a low potential across capacitor 602 for controlling the charging interval of capacitor 602. That is, capacitor 602 is not allowed to charge until transistor 605 is in a nonconducting state. This provides for precision control of the astable waveform period. The timing interval of oscillator 501 may be adjusted as desired by varying the resistance of potentiometer 603. In practice, this may be accomplished automatically by using a tapped resistor and relays in a manner known in the art. During the disable and guard action tests, which are described later, timing of oscillator 501 is under the control of a signal supplied from receiver 112 via circuit path 115 and resistor 606. During the disable and guard action tests, potentiometer 603 is eliminated from the timing circuit by activating either relay D or C (FIG. 5) and thus opening contacts 5D3 or 5C3, respectively.

Monostable multivibrator 502 is typical. It comprises normal monostable transistors 610 and 611. Timing of monostable 502 is accomplished via potentiometer 620, resistor 621 and capacitor 622. Transistor 625 provides for fast recovery of the monostable. Transistor 630 is used as an emitter follower to provide interstage buffering. Transistor 611 is the normally "ON" transistor of monostable 502. Thus, transistor 610 is normally "OFF." Accordingly, the signals developed at outputs 515 and 516 are representative of a logic "0" and a logic "1," respectively. The astable interval of monostable 502 may be adjusted by varying the resistance of potentiometer 620. In practice, a tapped resistor and relays may be used for this purpose. Monostable 502 is triggered by a signal supplied from oscillator 501 via circuit path 510. Once triggered into its astable state, monostable 502 supplies a signal to transistor 605 via circuit path 511, causing transistor 605 to shunt capacitor 602, thereby maintaining a very low potential across capacitor 602. Transistor 605 remains conducting until the astable interval of monostable 502 has terminated. In this manner, the timing of oscillator 501 and hence the period of the oscillator-monostable combination is accurately controlled. An oscillator-monostable multivibrator combination, essentially the same as that shown in FIG. 6 which may be used in the practice of the invention, is described in greater detail in copending application, R. D. Baum and D. L. Favin, filed Mar. 26, 1968, Ser. No. 716,201, now U.S. Pat. No. 3,551,704 issued Dec. 29, 1970.

In FIG. 7 are shown the details of disable release unit 250 of FIG. 2. Disable release unit 250 insures that the echo suppressors under test are in a predetermined or quiescent mode of operation before any subsequent test is performed on them. That is to say, disable release unit 250 enables the echo suppressors under test to terminate any mode of operation which they were previously in. This is accomplished in the present invention by momentarily open-circuiting circuit paths 231 and 232 via break contacts DR–1 and DR–2, respectively, thereby insuring that no test signals are supplied to the echo suppressors under test for a predetermined interval. Contacts DR–1 and DR–2 are controlled by relay DR which is driven by monostable multivibrator 700. Monostable 700 comprises transistors 701 and 702 and the associated circuitry. It is selectively triggered by momentarily removing source 705 from the emitter of transistor 701 via switching device 704. Signals are supplied to activate switching device 704, which may be a relay or the like, via circuit path 114F.

Details of receiver 112 are shown in simplified block schematic form in FIG. 3. Signals which have been propagated through the test circuit are supplied via circuit path 126 to either test receive input 126A or auxiliary receive input 126B, depending upon the test being performed. Line selector 301 isolates test receive input 126A from auxiliary receive input 126B. Typically, line selector 301 includes coupling networks for matching the receiver input impedance with that of the telephone transmission trunks. In practice the line selector function, that is, the function of routing signals on either of inputs 126A or 126B to circuit path 302, is accomplished by utilizing switching devices, for example, relays or the like in a manner well known in the art. Signals from line selector 301 are supplied via circuit path 302 to band reject filter 303 where the 2,100 Hz. portion of the received signal is suppressed. Filter 303 may be any one of the numerous types well known in the art. The 2,100 Hz. signal is suppressed in order to enhance reception of the test signals. Suppression of this signal is of no consequence since it does not contain information relative to any of the tests to be performed. The filtered signals are supplied to detector 304 via amplifier 305 and full-wave rectifier 306. The amplified received signals are full wave rectified to obtain a unidirectional signal for purposes of detection. Details of detector 304 are shown in FIG. 8 and are explained later.

Figure 9:
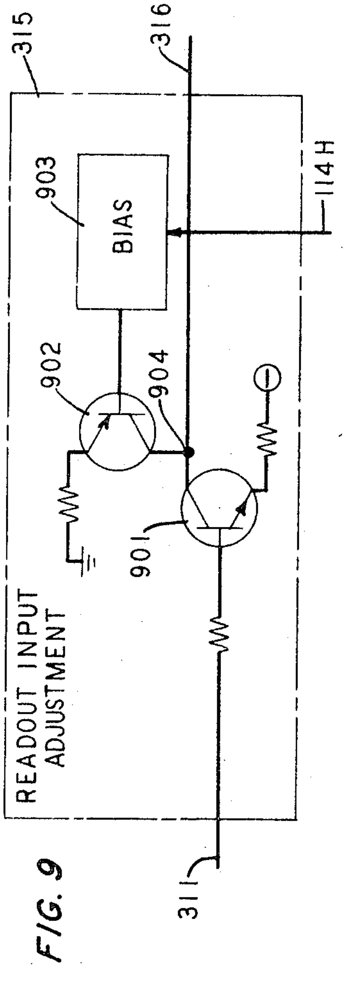
FIG. 9 shows in schematic form the readout input adjustment unit of FIG. 3.

Readout input adjustment network 315 is supplied with the detected signals via smoothing filter 310. These signals are proportional to the duty cycle of the received signals. They are compared in network 315 with predetermined reference signals which have been established for the individual tests which are to be performed. Details of readout input adjustment network 315 are shown in FIG. 9. The algebraic difference between the detected signals and the reference signals is supplied to readout 320 where it is determined whether the echo suppressor under test has passed or failed the particular test. Readout sensitivity unit 325 provides for adjustment of the sensitivity of readout 320 in accordance with the specific test being performed. The sensitivity adjustment of readout 320 provided by sensitivity unit 325 in conjunction with the comparison of the received signals with preestablished reference signals provided by readout input adjustment 315 establish "go-no-go" test limits for the specific test being performed. Readout sensitivity unit 325 may be, for example, assuming readout 320 to be a voltmeter, a plurality of shunting networks which are switched or otherwise placed in circuit relationship with the meter for adjusting its sensitivity as required for the specific tests being performed.

Figure 8:
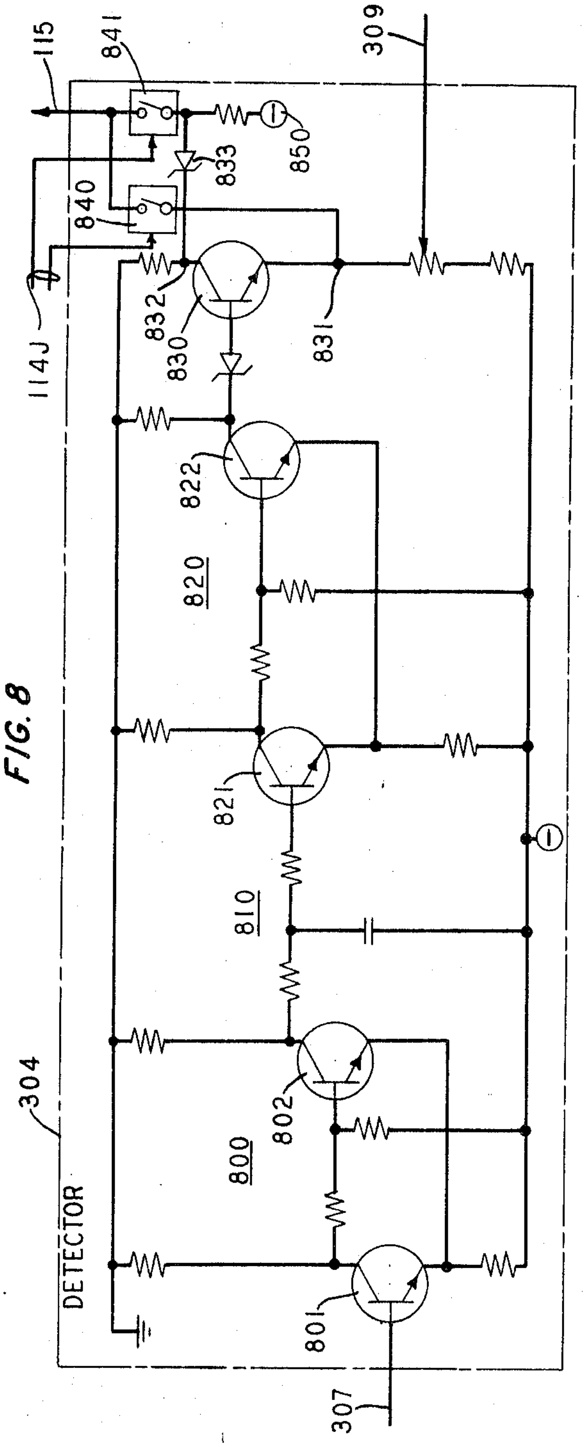
FIG. 8 depicts in schematic form details of the detector of FIG. 3.

FIG. 8 depicts in schematic form the details of detector 304. Shown is first Schmitt trigger 800, including transistors 801 and 802 and the associated circuitry, which is utilized to detect the envelope of the received signal. The envelope signal from Schmitt trigger 800 is supplied to integrator 810 where noise peaks are eliminated. The integrated signal is supplied to second Schmitt trigger 820 which includes transistors 821 and 822 and associated circuitry where the duty cycle of the envelope signal is accordingly detected.

The signals developed by Schmitt trigger 820 are proportional to the duty cycle of the received signal and are first supplied to emitter follower transistor 830 and thereafter to output circuit path 309. The potentials developed at the emitter of transistor 830 at 831 and the collector of transistor 830 at 832 are selectively supplied via switching elements 840 and 841 to circuit path 115 for controlling transmitter 111 (FIG. 1) during particular tests.

Details of readout input adjustment 315 are shown in schematic form in FIG. 9. Basically, readout input adjustment 315 is a voltage comparator circuit comprising transistors 901 and 902. Operation of this circuit is straightforward. The signal supplied to the base of transistor 901 via circuit path 311 is a DC voltage which is proportional to the duty cycle of the received signal. Standard or reference signals are generated in well-known fashion in biasing network 903 and are selectively supplied, in accordance with the particular test being performed, to the base of transistor 902. In the circuit configuration shown in FIG. 9, the circuit connection between the collectors of transistors 901 and 902 at 904 is, in effect, a current summing point. Accordingly, if the signals supplied to the bases of both transistors 901 and 902 are identical, no current flows to circuit path 316. If, for example, the potential supplied to the bases of transistors 901 and 902 are not equal, a signal proportional to the algebraic difference of the signals supplied to the respective bases is supplied via circuit path 316 to readout 320 (FIG. 3). Accordingly, no signal is supplied to readout 320 when the detected signal supplied to readout input adjust 315 is equal to the reference signal.

FIG. 4 depicts the details of loop-around unit 150. In practicing the invention, path 134 of test trunk 130 is connected to terminals 401 of loop-around unit 150. Similarly, path 144 of auxiliary trunk 140, is connected to terminals 402. Paths 134 and 144 are interconnected via transformer 403, the 1 and 2 make contacts of relay F, band reject filter 410 and transformer 411 to form a portion of a test loop. Path 133 of test trunk 130 and path 143 of auxiliary trunk 140 are interconnected via transformer 412 to complete the test loop. Oscillator 420, which may be the milliwatt supply of far-end office 101, supplies a signal at a predetermined frequency and amplitude to path 134 of test trunk 130 which is utilized to calibrate the test equipment. Upon initiating the calibration procedure, relay G is activated for a predetermined interval to short the output of oscillator 420 via the 1 make of G. This procedure allows certain equipment which may be in trunk 134 to achieve a predetermined mode of operation. On completion of the calibration procedure, to be described later, oscillator 420 is separated from path 134 by activating relay F in a manner well known in the art.

DESCRIPTION OF TEST PROCEDURE

In testing telephone trunk systems, several types of echo suppressors utilized in telephone systems may be encountered. In general, they are divided into two groups, namely, "split" echo suppressors and "full" echo suppressors. Split-type echo suppressors are usually employed in long delay transmission circuits and include separate suppressor elements at each end of the transmission path. The full echo suppressor is generally used in relatively short delay transmission circuits. Basically, it comprises two split suppressors which are located at one end of the transmission path. Several types of full and split echo suppressors are known in the art.

Although the various types of echo suppressors may have different specific parameters, their functional operating characteristics must, by necessity, be similar. Thus, we have discovered that echo suppressors, of whatever type, operating in transmission paths may be adequately evaluated by performing a plurality of unique in-circuit dynamic tests.

The dynamic tests to be performed are related to functional characteristics such as "suppression", "break-in," "disable" and "guard action". In practice, two modes of suppression testing are performed, namely, nonoperate and operate. During the nonoperate mode, the echo suppressor or suppressors under test are evaluated to determine whether or not they are oversensitive. In the operate mode of suppressor testing, what is known in the echo suppressor art as "odd" and "even" sensitivity, and "hangover" time, are evaluated. Similarly, the break-in test is divided into nonoperate and operate modes. During the nonoperate mode of break-in testing, echo suppressor differential sensitivity is evaluated. In the break-in test operate mode, the suppressor is evaluated for misadjustment of the differential sensitivity and also for what is known in the echo suppressor art as "break-in hangover" time. The disable test is also divided into nonoperate and operate modes. As is evident, these modes of testing merely check whether the disable feature and associated parameters of the echo suppressor is functioning properly. The guard action test determines whether the echo suppressor may be disabled in the presence of voice band frequencies on the transmission line.

In accordance with the invention, testing of echo suppressors in a telephone trunk, for example, echo suppressors 131 and 132 in test trunk 130 (FIG. 1), is initiated by first "-seizing" master unit 110. This is accomplished at testboard 120–1 by activating, for example, a switch associated with control panel 121–1. Once master unit 110 has been seized by control panel 121–1, all of the other control panels, namely, 121–2 through **121–*N*, are "locked-out" of the test system, in a manner well known in the art. This insures uninterrupted testing of the telephone trunk or trunks associated with the control panel, in this example, 121–1, which has first seized control of master unit 110**.

Once master unit 110 has been seized, far-end office 101 is dialed over test trunk 130, utilizing switching connection equipment 122–1 and a test code which is associated with testboard 120–1, in a manner well known in the art. In this step of the test procedure, trunk 130 is connected to loop-around unit 150. As noted above, loop-around unit 150 supplies a first calibration signal, having a predetermined amplitude and frequency, namely 1,000 Hz., which is propagated to master unit 110 via path 134 of test trunk 130. In master unit 110 the received calibration signal is supplied to receiver 112 wherein it is utilized to preset readout 320 (FIG. 3) by adjustment of readout sensitivity unit 325 to establish a predetermined readout setting. Upon completion of this first calibration step, far-end office 101 is dialed over a second telephone trunk, namely, auxiliary trunk 140, again utilizing equipment 122–1 and a test code associated with testboard 120–1. As described above, path 143 and path 144 of test trunk 140 are connected via loop-around unit 150 to path 133 and path 134 of trunk 130, respectively. Once the test circuit has been completed by the interconnection of trunk 130 with trunk 140, a second calibration step is performed.

Accordingly, two test signals are generated in transmitter 111, one at the same frequency as the signal supplied from loop-around unit 150 during the first calibration step, namely 1,000 Hz., and a second signal at 2,100 Hz. These signals are supplied via circuit path 125 (FIG. 1) to transmit path 144 of auxiliary trunk 140. The 2,100 Hz. signal is utilized to disable echo suppressors 141 and 142 in auxiliary trunk 140 so that they do not interfere with the testing of echo suppressors 131 and 132 in trunk 130. Both the 1,000 Hz. and 2,100 Hz. signals are supplied to loop-around 150 wherein the 2,100 Hz. signal is attenuated by band reject filter 410 (FIG. 4). Thus, the second 1,000 Hz. calibration signal and the attenuated 2,100 Hz. signal are supplied to path 134 and eventually to receiver 112. Losses in auxiliary trunk 140 are compensated by adjusting the gain of auxiliary amplifier 245 (FIG. 2) so that the signal indicated by readout 320 (FIG. 3) is the same value as that previously indicated during the first calibration step. That is to say, the transmitter gain is adjusted so that the received level of the 1,000 Hz. signal propagated through the circuit comprising auxiliary path 144 and test path 134 is the same as the signal propagated from loop-around unit 150 through test path 134 only. Upon completion of the two calibration steps, the echo suppressors in the test trunk 130 may be evaluated. The other trunks in the trunk group which includes trunks 130 and 140 may also be tested as desired. No recalibration of the test equipment is required. However, if a different auxiliary trunk is selected, the test equipment must be recalibrated to compensate for the losses in the "new" auxiliary trunk.

Testing of either echo suppressor 131 or 132 is now commenced by programming master unit 110 for the particular test or tests to be performed via control panel 121-1. For example, the particular type of echo suppressor to be tested dictates the signal timing used. Echo suppressor location, namely, near-end or far-end determines the routing of the test signals. That is to say, signals for testing near-end suppressor 131 may be supplied via path 133 while the same signals for testing far-end suppressor 132 may be supplied via path 144. The particular test to be performed determines the signal format to be utilized.

1. Suppression Test

Suppression testing, for example, of the "odd" side of echo suppressor 131 (FIG. 1) is accomplished in accordance with the invention by propagating selected test signals through the test circuit of FIG. 1 and selectively through echo suppressor 131. Accordingly, a plurality of test signals, namely, a 1,000 Hz. pulsating signal, a 2,750 Hz. monitor signal and a 2,100 Hz. disable signal are generated in transmitter 111 (FIG. 2). These test signals are utilized in performing nonoperate and operate modes of suppression testing.

Figure 10A:
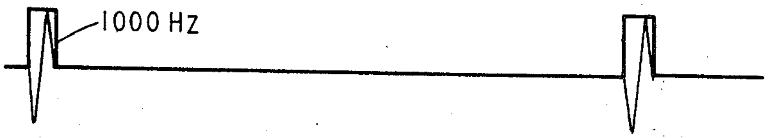
FIG. 10A through FIG. 10E show a sequence of waveforms useful in describing suppression testing of echo suppressors.
Figure 10B:
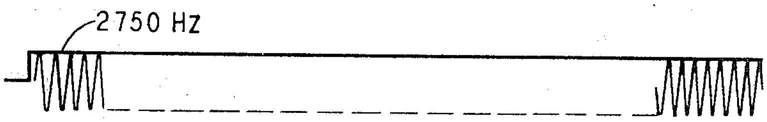

In both the nonoperate and operate modes of suppression testing, continuous 1,000 Hz. 2,100 Hz. and 2,750 Hz. signals are generated by oscillators 201, 202 and 203, respectively, and are supplied to transmission gates 211, 212 and 213, respectively. The 2,100 Hz. signal is additionally supplied via switching element 215 to auxiliary amplifier 245. It is thereafter utilized to disable the echo suppressors in the auxiliary telephone trunk. Gates 211, 212 and 213 are controlled by signals supplied from timing and control unit 220. Referring briefly to FIG. 5, relays A and B are activated during the suppression test to set up the circuit paths for supplying signals to the gates. Thus, monostable output 516 is supplied to circuit path 221, source 530 is supplied to circuit path 222 and ground is supplied to circuit path 223. These signals and potentials are used in well-known fashion to control the operation of transmission gates 211, 212 and 213. For example, the negative potential supplied from source 530 maintains gate 212 in a nonconducting or OFF state. The ground potential supplied via circuit path 223 maintains gate 213 in an ON state. Thus, gate 213 emits a continuous signal as shown in FIG. 10B. Signals developed at monostable output 516 and supplied to gate 211 via circuit path 221 are used to obtain the pulsating 1,000 Hz. signal as depicted in FIG. 10A. In this example, the 1,000 Hz. signal has a pulse width of approximately 15 milliseconds and a total period of approximately 200 milliseconds. These timing intervals may vary for different types of echo suppressors, depending on their individual parameters, not important to the description of the present invention. The 1,000 Hz. signal and the 2,750 Hz. signal are supplied to adjustment unit 225 where they are adjusted to have predetermined amplitudes. For the nonoperate mode of suppression testing, the 1,000 Hz. signal is adjusted to a predetermined amplitude below that which should normally activate the echo suppressor. The 2,750 Hz. signal is also adjusted to a predetermined amplitude which is below the prescribed minimum operating level of the echo suppressors to be tested. The pulsating 1,000 Hz. signal is supplied via line selector 230 to auxiliary amplifier 245 and the continuous 2,750 Hz. monitor signal is supplied via line selector 230 to test amplifier 240. Thus, the 1,000 Hz. and the 2,100 Hz. signals are supplied via circuit path 125 to transmit path 144 of auxiliary trunk 140 (FIG. 1) and the 2,750 Hz. monitor signal is supplied to transmit path 133 of test trunk 130. The 2,100 Hz. signal disables echo suppressors 141 and 142 in auxiliary trunk 140. It does not affect suppressors 131 and 132 because it is attenuated a predetermined amount by band reject filter 410 in loop-around unit 150 (FIG. 4). Only the 1,000 Hz. pulsating signal is supplied to path 134 of trunk 130 and hence to the odd side of echo suppressor 131. The 2,750 Hz. monitor signal is propagated through the portion of echo suppressor 131 associated with transmit path 133, commonly referred to as the "even" side. It is supplied to receiver 112 via loop-around unit 150 and receive path 143 of auxiliary trunk 140. If the odd side of echo suppressor 131 is not "over" sensitive, it should not detect the 1,000 Hz. signal and the monitor signal should arrive at receiver 112 uninterrupted. On the other hand, if the odd side of echo suppressor 131 is "too" sensitive, the 1,000 Hz. signal is detected, and the monitor signal should arrive at receiver 112, having interruptions caused by insertion of attenuation in the circuit path associated with the even side of suppressor 131. Since readout unit 320 of receiver 112 (FIG. 3) is programmed to indicate that echo suppressor 131 is functioning properly only upon detection of a continuous monitor signal, any monitor waveform having interruptions in it will cause readout unit 320 to indicate that echo suppressor 131 has failed this test.

Figure 10C:
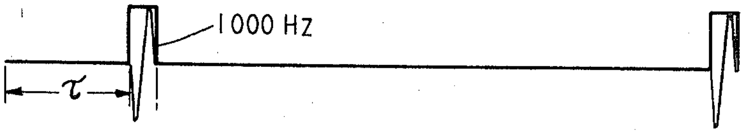
Figure 10D:
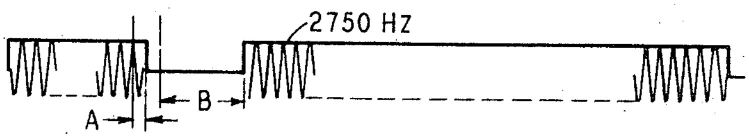
Figure 10E:
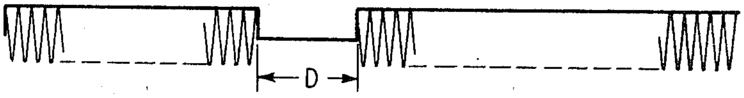

The operate mode of suppression testing is performed, utilizing the same signals as were used in the nonoperate mode of testing, except the amplitude of the 1,000 Hz. pulsating signal is increased to a level which is a predetermined amount greater than the minimum operate level acceptable for the class of echo suppressors in which echo suppressor 131 is included. FIG. 10C shows the 1,000 Hz. signal which is supplied to the odd side of echo suppressor 131. The propagation delay $\tau$ resulting from transmitting the signal through path 144, loop-around unit 150 and path 134 is indicated. The effect upon the 2,750 Hz. monitor signal of echo suppressor 131 reacting to the 1,000 Hz. pulsating signal is shown in FIG. 10D. As expected, the monitor signal is interrupted by attenuation which is inserted in the circuit path associated with the even side of echo suppressor 131 upon detection of the 1,000 Hz. signal at the odd side of echo suppressor 131. If the odd side sensitivity is too low, the monitor signal is not interrupted because no attenuation is inserted in the even side. Delay A depicted in FIG. 10D between the application of the 1,000 Hz. signal and the insertion of attenuation is commonly known as echo suppressor "pickup" time. Delay B, in removing the inserted attenuation after termination of the 1,000 Hz. signal, is commonly known as echo suppressor "hangover time." Thus, the signal supplied to receiver 112 as shown in FIG. 10E should include a 2,750 Hz. signal which is periodically interrupted for an interval D. Interval D is equal to the echo suppressor "hangover time" plus the duration of the 1,000 Hz. pulse (15 milliseconds) minus the "pickup time" of the odd side of the echo suppressor. The acceptable limits of attenuation interval D are predetermined and are programmed into the receiver by selecting a predetermined bias in readout input adjustment unit 315 (FIG. 9) and by adjusting readout sensitivity in unit 325 so that readout unit 320 (FIG. 3) indicates directly whether the interrupted interval of the received 2,750 Hz. monitor signal is within the predetermined limits.

Echo suppressor 131 is a split-type suppressor and, accordingly, no even side suppression test can be made in the above-described manner. A measure of even side sensitivity and hangover time may be attained during a "differential" sensitivity test. Details of such a test are discussed later in conjunction with break-in testing. Even side sensitivity and hangover tests, however, may be readily made on a full type suppressor, for example, by merely supplying the monitor signal to auxiliary path 144 and by supplying the 1,000 Hz. signal to test path 133. That is to say, the test signals utilized for the odd sensitivity test are interchanged to perform an even sensitivity test. Suppression testing of the far-end echo suppressor would also follow the procedure outlined above for near-end suppressor 131, the only difference being the paths to which the respective signals are supplied.

Thus, by performing nonoperate and operate suppression tests, echo suppressor 131 is evaluated to determine whether its sensitivity, "hangover time" and pickup time are within acceptable limits.

2. Break-in Test

The primary purpose of break-in testing is to determine whether the differential sensitivity of the echo suppressor under test is within predetermined acceptable limits. Simply stated, this test is performed by selectively supplying similar test signals to both sides, odd and even, of the echo suppressor under test and observing which of these signals controls propagation through the suppressor. When testing full-type echo suppressors, the signal supplied to either the odd or even input, which has the greatest effective energy, will cause the echo suppressor to suppress the signal supplied to the other input and hence "breakthrough." Split-type echo suppressors cannot suppress signals supplied to their odd side. However, the signal supplied to the even side of a split suppressor may break through suppression inserted by the echo suppressor if the amplitude of the signal supplied to the even side is of a sufficiently high value. Thus, both sides of full-type echo suppressors are evaluated for the break-in while only the even side of split suppressors is evaluated. A measure of even side suppression sensitivity may also be obtained for split suppressors during this test. In addition to testing for differential sensitivity, what is known in the echo suppressor art as "break-in hangover" time is also determined during break-in testing for those echo suppressors having such circuitry. Accordingly, break-in nonoperate and break-in operate tests are performed to determine whether the differential sensitivity and break-in hangover time are properly adjusted.

Break-in testing of, for example, far-end echo suppressor 132 (FIG. 1) is initiated by selectively programming master test unit 110. As in the case of the suppression test described above, this is accomplished at control panel 121–1 by either selecting the appropriate push buttons corresponding to the test to be performed, the type echo suppressor and the location of the echo suppressor, or by supplying an appropriate program tape or the like to control panel 121–1.

Figure 11A:
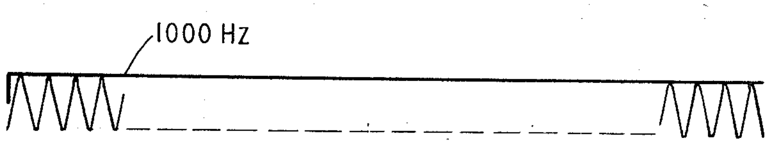
FIG. 11A through FIG. 11D show waves useful in describing break-in testing of echo suppressors.
Figure 11B:
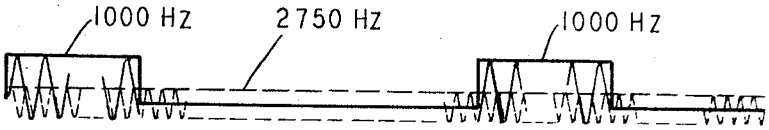

The test signals utilized in performing break-in testing are generated in transmitter 111. These signals include a 1,000 Hz. continuous signal, a 1,000 Hz. pulsating signal, a 2,750 Hz. monitor signal and a 2,100 Hz. disable signal. The timing intervals of these signals are preestablished in accordance with the type echo suppressor being tested and the test circuit. Referring briefly to FIG. 2, the required test signals are generated by oscillators 201, 202 and 203 and are controlled via gates 211, 212 and 213 and switching elements 214 and 215 in a manner essentially the same as for the suppression test procedure described above. Thus, the 2,100 Hz. signal is supplied via switching element 215 to auxiliary amplifier 245 and to auxiliary trunk 140 (FIG. 1) to disable echo suppressors 141 and 142. The continuous 1,000 Hz. signal, referred to as a "bias" signal, is generated at a predetermined amplitude and supplied to test amplifier 240 via switching element 214 and line selector 230. Element 214 is activated for this test by a signal supplied on circuit path 114A. The bias signal, as shown in FIG. 11A, is supplied to the odd side of echo suppressor 132 via path 133 of test trunk 130 for the purpose of causing suppressor 132 to insert attenuation into circuit path 134 which is in circuit relationship with the even side of suppressor 132. Accordingly, the amplitude of the bias signal is set at a predetermined level, sufficient to activate echo suppressor 132 for inserting attenuation into its even side. The 2,750 Hz. monitor signal is supplied to path 144 of auxiliary trunk 140 through loop-around unit 150 to path 134 of trunk 130 and hence to the even side of suppressor 132. As in the suppression test, the monitor signal is continuous and has an amplitude which is below the minimum operate level of echo suppressor 132. The monitor signal, as shown in dashed outline in FIG. 11B, is generated in the same manner as that for the suppression test and therefore will not be described here. FIG. 11B also depicts the 1,000 Hz. pulsating signal which is also generated in the same manner as the 1,000 Hz. pulsating signal for the suppression test, the only difference being in the amplitude and the durations of the period and pulse width of the signal. In this example, the pulse width and period of the 1,000 Hz. test signal are 150 milliseconds and 600 milliseconds, respectively. These intervals are determined by factors relating to the echo suppressors under test, particularly the "break-in pickup time" and the "break-in hangover time."

Turning briefly to FIG. 6, the pulse width and the period intervals of the 1,000 Hz. pulsating signal are set by adjusting, in a known fashion, potentiometers 603 and 620 of oscillator 501 and monostable 502, respectively. For certain types of echo suppressors, it is advantageous also to pulse the monitor signal along with the 1,000 Hz. pulsating signal during break-in testing. Referring to FIG. 5, this is accomplished by activating relay E and supplying the control signals developed at output 516 of monostable 502 to circuit path 223 via the 1 make of E and 1 break of B. The control signals are supplied via circuit path 223 to gate 213 (FIG. 2). Thus, gate 213 is controlled in synchronism with gate 211, causing the 2,750 Hz. signal to have the same pulse width and period as the 1,000 Hz. pulsating signal.

The nonoperate portion of break-in testing is performed with the 1,000 Hz. pulsating signal, having a predetermined amplitude set at a level which is below the amplitude of the 1,000 Hz. bias signal being supplied to the odd side of suppressor 132. With these signals supplied to suppressor 132, no signal is supplied to receiver 113 on receive path 134 of trunk 130, that is, provided the differential sensitivity of suppressor 132 is not too sensitive in favor of its even side. If the even side sensitivity is too great, the pulsating 1,000 Hz. signal will break through and be supplied to receiver 113. A failure will be indicated because readout 320 (FIG. 3) is preprogrammed via readout input adjustment 315 and readout sensitivity unit 325 to indicate such a failure upon reception of any signal during this particular test procedure.

The operate mode of break-in testing is performed, utilizing the same signals as used for the nonoperate mode break-in testing except that the amplitude of the 1,000 Hz. pulsating signal is changed to a level which is a predetermined amount greater than the magnitude of the 1,000 Hz. bias signal. Since the pulsating 1,000 Hz. signal, which is supplied to the even side of suppressor 132, is now greater in magnitude than the bias signal which is supplied to the odd side of suppressor 132, the pulsating signal will break through the attenuation inserted in the even side of suppressor 132 in response to the bias signal. That is to say, breakthrough will occur provided that the differential sensitivity of echo suppressor 132 is properly adjusted. In many types of echo suppressors, break-in occurs or should occur instantaneously with the application of signals similar to those supplied in this test procedure. In certain types of echo suppressors, however, break-in occurs only after a predetermined interval. In explaining this test procedure, it has been assumed that echo suppressor 132 is of a type in which break-in occurs instantaneously.

Figure 11C:
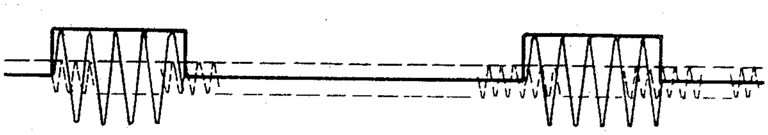

As previously stated, break-in hangover time, in addition to break-in sensitivity, is determined during this test procedure. Thus, with the 1,000 Hz. bias signal as shown in FIG. 11A and the 2,750 Hz. monitor signal and the 1,000 Hz. pulsating signal as shown in FIG. 11C supplied to suppressor 132, suppressor 132 operates to allow the pulsating signal and hence the monitor signal to break through the suppression inserted in circuit path 134. If the pulsating and monitor signals do not break through, the differential sensitivity of suppressor 132 is too great in favor of the odd side of suppressor 132. On the other hand, if the pulsating and monitor signals breakthrough as expected, this portion of the break-in sensitivity test has been passed by echo suppressor 132. Accordingly, readout 320 (FIG. 3) will indicate that the monitor signals have been received. However, readout 320 is programmed in relation to a "go-no-go" situation for indicating whether the break-in hangover time of suppressor 132 is within acceptable limits. Thus, although the break-in differential sensitivity of suppressor 132 may be within acceptable limits, readout 320 may indicate a failure of this test because the break-in hangover time is not within acceptable limits.

Break-in hangover time is a characteristic which is purposely built into echo suppressors to cope with what is commonly known in the echo suppressor art as "double-talking." To avoid possible intervals of speech mutilation during double-talking intervals, the break-in condition, that is, the duration during which attenuation is locked out of the transmit path associated with an echo suppressor, is continued for a predetermined interval, namely, the break-in hangover time. The break-in hangover interval is determined by detecting in receiver 113 the signals which have broken through the suppressor under test, as depicted in FIG. 11D.

Figure 11D:
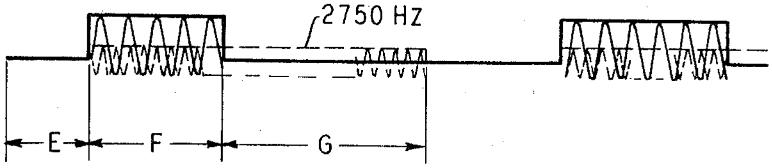

As in previous tests, the various functional units of receiver 113 (FIG. 3) are preprogrammed for specifically evaluating the particular received signal shown in FIG. 11D. The spread of acceptable timing intervals for this signal are set by selectively adjusting the bias of readout input adjustment 315 (FIG. 9) and by adjusting the sensitivity of readout 320 in sensitivity unit 325. The signal supplied to receiver 113, as shown in FIG. 11D includes, in addition to propagation delay E, interval F which is equal to the duration of the pulse width of the 1,000 Hz. pulsating signal (150 milliseconds) and interval G which is equal to the break-in hangover interval of the echo suppressor under test. Since pulse width F is constant, the received signal is a direct measure of the break-in hangover time.

The procedure outlined above is one for evaluating odd side break-in characteristics of a far-end suppressor. Testing the break-in characteristics of near-end echo suppressors or full-type echo suppressors may be accomplished by supplying the appropriate program to master unit 110 so that the break-in test signals are supplied to the appropriate paths of test trunk 130 and auxiliary trunk 140.

3. Disable Test

In utilizing the telephone system for certain applications, it is necessary to disable or otherwise make inoperative the echo suppressors in the telephone trunks. Data transmission over telephone trunks is a typical use that requires disabling of echo suppressors. It is also important that the echo suppressors are not falsely disabled during speech transmissions. Thus, nonoperate and operate disable tests are performed to insure trouble-free operation.

As is well-known in the art, echo suppressors "disable" in response to a 2,100 Hz. signal supplied to either the odd or even side. Thus, a disable signal supplied to either the transmit or receive paths of a telephone trunk will cause or should cause all the echo suppressors in that trunk to become inoperative. Similar to the break-in and suppression tests, the disable functions of an echo suppressor are evaluated by selectively propagating a monitor signal and a specially tailored test signal through the echo suppressor under test and the test system.

Figure 12A:
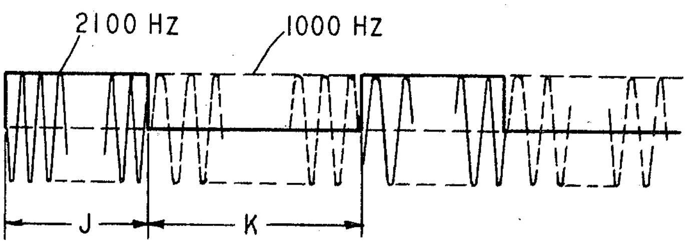
FIG. 12A and 12B depict waveforms which aid in describing disabler testing of echo suppressors.

In this example, master unit 110 (FIG. 1) is programmed via control panel 121-1 for the purpose of evaluating near-end echo suppressor 131 for its nonoperate and operate disable characteristics. The purpose of nonoperate disable testing is to determine whether suppressor 131 is caused to become inoperative in response to a disable signal which normally should not cause disabling to occur. Upon initiating nonoperate disable test, disable release 250 (FIG. 2) is activated to insure that no signals are supplied to suppressor 131 for a predetermined interval so that suppressor 131 assumes a quiescent state. FIG. 12A depicts a waveform which illustrates some of the signals utilized in the nonoperate mode of disable testing.

Briefly, the nonoperate disable test is performed by supplying a monitor signal to the even side of echo suppressor 131 and a disable signal to the odd side of suppressor 131 for a predetermined interval which is less than that which should normally cause the echo suppressor to become inoperative. The disable signal is followed by a suppression signal which is also supplied to the odd side of the suppressor. The suppression signal should cause the suppressor to insert attenuation into the circuit path associated with its even side and thereby suppress the monitor signal. If echo suppressor 131 is inoperative and does not suppress the monitor signal, it has failed this test.

Signals utilized for the disable test are generated in transmitter 111 (FIG. 2). As in previous tests, a continuous 2,100 Hz. disable signal is supplied to auxiliary trunk 140 to maintain echo suppressors 141 and 142 in an inoperative state. For disable testing, a 2,100 Hz. pulsating disable signal is also supplied to auxiliary trunk 140. In this example, the pulsating 2,100 Hz. signal is supplied via path 134 to the odd side of echo suppressor 131 to be tested. Hence, the 2,100 Hz. pulsating signal must be propagated through loop-around unit 150. As previously indicated, loop-around unit 150 includes a 2,100 Hz. band reject filter. Because of the attenuation of the filter, the magnitude of the transmitted 2,100 Hz. signal must be increased a predetermined amount to achieve the required level in path 134. Accordingly, a 2,100 Hz. signal is supplied from oscillator 202 to gate 212 where its timing interval is under the control of timing and control unit 220. Referring to FIG. 12A, the 2,100 Hz. pulsating signal has a predetermined pulse width J which is of a duration less than the minimum required for activating the disable mechanism of echo suppressor 131. The 2,100 Hz. pulsating signal is supplied to path 144 of auxiliary trunk 140 (FIG. 1) via amplitude adjustment 225, line selector 230 and auxiliary amplifier 245. As shown in FIG. 12A, immediately following the 2,100 Hz. signal is a 1,000 Hz. pulsating signal. As in previous tests, the 1,000 Hz. pulsating signal is developed in transmitter 111 by selectively controlling gate 211. The 1,000 Hz. pulsating signal is also supplied to auxiliary trunk 140 and hence to the odd side of echo suppressor 131. A 2,750 Hz. monitor signal is also generated in transmitter 111 and supplied to transmit path 133 of test trunk 130. In general, the 2,750 Hz. signal is continuous. For certain types of echo suppressors, however, it is desirable to utilize a pulsating 2,750 Hz. monitor signal. This is accomplished in transmitter 111 by controlling gate 213.

Referring briefly to FIG. 5, signals for controlling gates 211, 212 and 213 are supplied to circuit paths 221, 222 and 223. For the disable nonoperate test, relay D is activated. It is is desired to have a pulsating 2,750 Hz. signal, relay E is also activated. Thus, signals developed at output 515 of monostable 502 are supplied via the 1 make of D to circuit path 221. If relay E is activated, the signals developed at output 515 are also supplied to circuit path 223 via the 1 make of E and the 1 break of B. Signals developed at output 516 which are complements of those developed at 515 are supplied to circuit path 222 via the 2 make of D, the 1 break of A, the 1 break of C and the 2 break of B. With these signals supplied to echo suppressor 131, namely, the 2,100 Hz. disable, 1,000 Hz. suppression and 2,750 Hz. monitor signals, suppressor 131 will respond to insert attenuation in its even side and thereby suppress the monitor signal, that is, provided suppressor 131 is functioning properly. However, if suppressor 131 fails this test, a continuous or pulsating 2,750 Hz. signal, whichever is utilized, is received and accordingly indicated on readout unit 320 of receiver 112.

In order to insure that the nonoperate disable mechanism of suppressor 131 is functioning, transmitter 111 is controlled by receiver 112 for the purpose of retransmitting the sequence of test signals when the effective received monitor signal is insufficient. That is to say, suppressor 131 has passed the nonoperate disable test. Referring to FIG. 8, this feature is achieved by activating switching element 841. Thus, when the detected monitor signal is insufficient, transistor 830 is in a nonconducting state and a potential developed at 832 is supplied to transmitter 111 via diode 833, switching element 841 and circuit path 115. In transmitter 111, the potential supplied on circuit path 115 from receiver 112 is utilized, as shown in FIG. 6, to charge capacitor 602 of oscillator 501 via timing resistor 606. If echo suppressor 131 fails the nonoperate disable test, a monitor signal is detected in receiver 112 and no potential is supplied to transmitter 111 via circuit path 115 and hence the test is not repeated.

The disable operate test is performed to determine whether echo suppressor 131 properly responds to an appropriate disable signal. During the disable operate test, the minimum "release" time of the disable mechanism is evaluated. It is also determined whether or not the echo suppressor remains inoperative once the disable mechanism has been operated. Briefly, the disable operate test is initiated by first insuring that the suppressor under test is in a quiescent state. This is achieved by withholding signals from the suppressor under test for a predetermined interval. Further assurance that the suppressor under test is in a quiescent state is realized by activating disable release 250 (FIG. 2) upon initiation of the disable operate test. After the first no signal interval, a disabling signal is supplied to the odd side of the suppressor for a predetermined interval. The disable signal is followed by a second interval during which no signals are supplied. During the second no signal interval, the disable release characteristic is evaluated. After the second no signal interval, a disabling signal and a suppression signal are supplied to the odd side of the suppressor to determine whether it continues to be inoperative. As in previous tests, the reaction of the suppressor to the application of the various test signals is determined by evaluating a monitor signal transmitted to the even side of the echo suppressor under test.

Figure 12B:
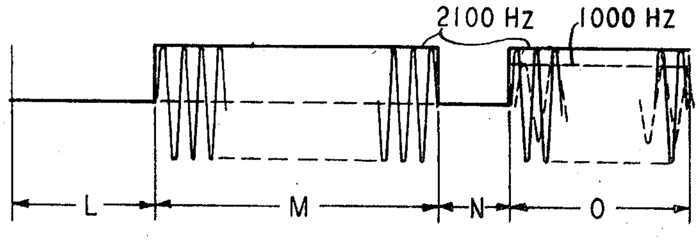

FIG. 12B depicts a waveform which includes signals utilized in the disable operate test. The 2,750 Hz. monitor signal and the 2,100 Hz. continuous disable signal are not shown. The waveform shown is generated in transmitter 111 (FIG. 2) by selectively controlling gates 211, 212 and 213 with signals developed in timing and control unit 220. Referring to FIG. 5, relays A and D are activated for this test. As in the other test procedures, relay E may be activated if a pulsating 2,750 Hz. monitor signal is required. Thus, with relays A and D activated, gate 211 is under the control of signals developed at output 515 of monostable 502, gate 212 is controlled by signals developed at output 520 of astable 503 and gate 213 is controlled by the ground potential supplied via the 1 break of E and the 1 break of B. Astable 503 generates a signal comprising the timing intervals L and M, and monostable 502 has an astable interval comprising the sum of timing intervals L, M and N as shown in FIG. 12B. Since astable 503 is controlled in part by monostable 502, the waveform of FIG. 12B results from superimposing the monostable interval upon the astable intervals. Thus, the resulting timing sequence for the signal supplied to the odd side of suppressor 131 is: no signals supplied during interval L, a 2,100 Hz. signal supplied during interval M, no signal supplied during interval N, and both a 2,100 Hz. and a 1,000 Hz. supplied during interval O. Interval signals N and M are generated by astable 503. Interval N results from the interaction of monostable 502 with astable 503. Upon completing its astable interval, monostable 502 operates to disable astable 503, causing output 520 to assume a predetermined signal condition which maintains gate 212 on. Interval O is determined partly by receiver 112. As previously discussed, if echo suppressor 131 fails this portion of the disable test, a signal is supplied to oscillator 501 (FIG. 5) which causes the disable operate test to be repeated.

Referring to FIG. 1, the signals shown in FIG. 12B are supplied to the odd side of suppressor 131 via path 144, loop-around 150 and path 134. The 2,100 Hz. signal supplied during interval M should cause suppressor 131 to disable. No signals are supplied during interval N to determine whether the disable mechanism releases prematurely. Whether suppressor 131 has disabled and not released from that condition is determined during interval O. If suppression 131 has been disabled and remains in that condition, the 1,000 Hz. and 2,100 Hz. signal will have no effect on suppressor operation, and the 2,750 Hz. monitor signal supplied to the even side of suppressor 131 is supplied to receiver 112 to indicate that this test has been passed. On the other hand, if suppressor 131 was not disabled during interval M (FIG. 12B) or released during interval N, the 1,000 Hz. signal should cause the 2,750 Hz. monitor signal to be suppressed. This condition is indicated in receiver 112 as a failure of this test.

4. Guard Action Test

Figure 13:
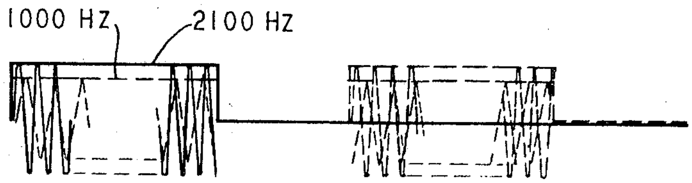
FIG. 13 shows a waveform useful in describing guard action testing of echo suppressors.

Guard action is a feature of echo suppressors which prohibits the activation of the echo suppressor disabling mechanism so long as other voice frequency components are being propagated through the echo suppressor. FIG. 13 shows a waveform of signals utilized in guard action testing. Shown are a 2,100 Hz. disable signal and a 1,000 Hz. suppression signal. As in previous tests, a 2,750 Hz. monitor signal is supplied to the even side of the suppressor under test, for example, on path 144, through loop-around 150 and path 134 to suppressor 132 (FIG. 1). The 2,100 Hz. signal and a 1,000 Hz. signal are supplied to the odd side of suppressor 132 on path 133 of test trunk 130. If suppressor 132 is functioning properly, it should not disable, and the 2,750 Hz. monitor tone is suppressed because of the 1,000 Hz. suppression signal. This is accordingly indicated in receiver 112 (FIG. 3) because no continuous monitor signal is detected, and hence no signal is supplied to readout 320. If suppressor 132 disables, the monitor signal is not suppressed and a continuous signal is detected in receiver 112 wherein a failure is indicated on readout 320. To insure that the guard action mechanism of suppressor 132 is functioning properly, the transmitter 111 is again under the control of receiver 112. In particular timing and control unit 220 (FIG. 2) is controlled by a potential developed in detector 304 (FIG. 3).

Referring to FIG. 8, control of transmitter 111 by receiver 112 is achieved by activating switching element 840. A potential for charging the timing circuit of oscillator 501 of timing control unit 220 is developed at point 831 and supplied to oscillator 501 only upon detection of a continuous monitor signal, indicating failure of this test, which causes transistor 830 (FIG. 8) to conduct. Thus, the test signals are retransmitted upon detection of a continuous monitor signal in receiver 112. This is indicated in FIG. 13 by the waveform in dashed outline. As in previous tests, the test signals utilized in guard action testing are generated in transmitter 111 and need not be discussed.

The apparatus and method of this invention have been illustrated in conjunction with testing echo suppressors in telephone trunks. Numerous other arrangements, however, may be devised by those skilled in the art. For example, the apparatus and method described herein may be utilized to perform bench tests on individual echo suppressors or to evaluate echo suppressors in telephone access lines.

What is claimed is:

1. Apparatus for testing an echo suppressor which comprises, means for selectively generating a plurality of test signals each having a predetermined frequency, means for selectively supplying said test signals in a predetermined format to said echo suppressor, detector means responsive to a selected one of said test signals supplied to said echo suppressor, and means responsive to a signal developed by said detector means for indicating whether said detected signal is within preestablished test limits set for a characteristic of the echo suppressor being tested.

2. Apparatus as defined in claim 1 further including means for programing said generating means, supplying means, detector means and indicating means to establish predetermined conditions therein for evaluating a functional characteristic of said echo suppressor.

3. Apparatus for testing an echo suppressor which comprises, a source of a plurality of test signals, controllable gate means supplied with said test signals for generating predetermined waveforms of said test signals, means for selectively supplying said test signal waveforms to an echo suppressor in a predetermined format, detector means responsive to a selected one of said test signals supplied to said echo suppressor, means responsive to a signal developed by said detector means for indicating whether said detected signal is within preestablished test limits set for a characteristic of said echo suppressor being tested, and means for generating signals to program said controllable gate means, said supplying means, said detector means and said indicating means to establish predetermined conditions therein for evaluating a predetermined characteristic of said echo suppressor.

4. Apparatus as defined in claim 3 wherein said echo suppressor has first and second circuit paths and said supplying means includes switching means responsive to signals generated by said programing means for supplying selected ones of said test signal waveforms to said first path and others of said test signal waveforms to said second path in a predetermined format according to the functional characteristic being evaluated.

5. Apparatus which comprises, a test station, means at said test station for establishing a test circuit, said circuit including at least one echo suppressor, means at said test station for requesting a test of said echo suppressor, first means responsive to said requests for selectively generating a plurality of test signals each having a predetermined frequency, second means responsive to said requests for selectively supplying said test signals in a predetermined format to said test circuit, third means responsive to said requests for automatically evaluating test signals propagated through said test circuit, said third means including detector means responsive to a selected one of said test signals, means for comparing signals developed by said detector means with predetermined reference signals and means for indicating whether said compared signals are within preestablished limits set for a characteristic of said echo suppressor being tested.

6. Apparatus as defined in claim 5 wherein said first means includes a plurality of signal sources for supplying signals at predetermined frequencies and switching means in circuit relationship with said signal sources for developing predetermined waveforms of said signals in accordance with the functional characteristic being tested.

7. Apparatus as defined in claim 5 wherein said test circuit further includes a first transmission path including said echo suppressor, a second transmission path and loop around means for interconnecting said first transmission path with said second transmission path.

8. Apparatus as defined in claim 7 wherein said loop-around means includes generator means for generating a signal having a predetermined frequency, switching means for selectively supplying said generated signal to said first transmission path and filter means for attenuating selected ones of said test signals supplied to said test circuit.

9. Apparatus as defined in claim 7 wherein said second means switching includes means for selectively routing selected ones of said test signals to said first transmission path and others of said test signals to said second transmission path to be propagated to said echo suppressor in accordance with the functional test requested.

10. Apparatus as defined in claim 5 wherein said echo suppressor includes first and second circuit paths, and said test signals include a first signal at a predetermined frequency and having a predetermined amplitude, said first signal being supplied to said first circuit path for predetermined intervals to evaluate the operation of the suppression mechanism of said echo suppressor and a second signal at a predetermined frequency and having a predetermined amplitude below the prescribed minimum operate level of said echo suppressor at said second signal frequency, said second signal being supplied to said second circuit path for monitoring the response of said echo suppressor to said first signal.

11. The apparatus as defined in claim 10 wherein said test circuit includes first and second transmission paths and a plurality of echo suppressors in said transmission paths, and said test signals further include a third signal at a predetermined frequency and amplitude for disabling the echo suppressors in a selected one of said transmission paths to eliminate them from said test circuit.

12. Apparatus as defined in claim 5 wherein said echo suppressor includes first and second circuit paths, and said test signals include a first break-in test signal at a predetermined frequency and having a predetermined amplitude, a second break-in test signal at a frequency substantially the same as said first break-in test signal frequency and having an amplitude a predetermined amount greater than the amplitude of said first break-in test signal, said first and second break-in test signals being selectively simultaneously supplied for predetermined intervals to said first and second echo suppressor circuit paths, respectively, to evaluate break-in characteristics of said echo suppressor and a monitor signal at a predetermined frequency and having an amplitude below the prescribed minimum operate level of said echo suppressor at said monitor signal frequency for monitoring the response of said echo suppressor to said first and second break-in test signals.

13. Apparatus as defined in claim 12 wherein said test signals further include a disable signal at a predetermined frequency and amplitude for disabling echo suppressors other than said echo suppressor under test in said test circuit.

14. Apparatus as defined in claim 5, further including inhibitor means in circuit relationship with said second means and responsive to said requests for insuring that no signals are supplied to said test circuit for a predetermined interval upon request for testing predetermined characteristics of said echo suppressor.

15. Apparatus as defined in claim 14 wherein said echo suppressor includes first and second circuit paths, and said test signals include a first disable test signal having a predetermined frequency and amplitude for evaluating the disable mechanism of said echo suppressor, said first disable test signal being supplied to said first circuit path for a predetermined interval less than that which normally should cause said disable mechanism to operate, a suppression test signal at a predetermined frequency and amplitude supplied to said first path for a predetermined interval which normally should cause the suppression mechanism of said echo suppressor to operate and a monitor signal at a predetermined frequency and having an amplitude below the prescribed minimum operate level of said echo suppressor at said monitor signal frequency, said monitor signal being supplied to said second circuit path for monitoring the response of said echo suppressor to said first disable test signal and said suppression test signal.

16. Apparatus as defined in claim 15 further including in said third means, means selectively responsive to said monitor signal for initiating regeneration of said test signals upon detection of a predetermined state of said detected signal in said third means.

17. Apparatus as defined in claim 5 wherein said echo suppressor includes first and second circuit paths, and said test signals include a second disable test signal at a predetermined frequency and amplitude, said second disable test signal being supplied to said first circuit path for first and second predetermined intervals which should cause the disable mechanism of said echo suppressor to operate and a suppression test signal at a predetermined frequency and having an amplitude which should normally cause the suppression mechanism of said echo suppressor to operate, said suppression test signal being supplied to said first circuit path during said second interval of said second disable test signal, said first and second intervals being separated by an intervening interval of predetermined duration for determining whether the disable mechanism of said echo suppressor remains operative, and a monitor signal at a predetermined frequency and having an amplitude below the prescribed minimum operate level of said echo suppressor, said monitor signal being supplied to said second circuit path for monitoring the response of said second circuit path for monitoring the response of said echo suppressor to said second disable test signal and said suppression test signal during said second interval.

18. Apparatus as defined in claim 17 wherein said third means further includes means responsive to said detected signals for initiating regeneration of said test signals upon detection of a predetermined state of said monitor signal in said detector means.

19. Apparatus as defined in claim 14 wherein said echo suppressor has first and second circuit paths, and said test signals include a disable signal, a suppression signal, said disable and suppression signals being simultaneously supplied to said first circuit path for a predetermined interval greater than the prescribed interval for activating the disable mechanism of said echo suppressor to determine whether operation of said disable mechanism is inhibited and a monitor signal supplied to said second circuit path for determining the response of said echo suppressor to said disable and suppression signals.

20. Apparatus as defined in claim 19, further including in said third means, means selectively responsive to said monitor signal for initiating regeneration of said test signals upon detection of a predetermined state of said monitor signal in said third means.

21. A method of testing echo suppressors which comprises the steps of, establishing a test circuit having first and second transmission paths connected together at their remote ends, said test circuit including at least one echo suppressor, generating a plurality of test signals each having a predetermined frequency, generating a monitor signal having a predetermined frequency and an amplitude below the prescribed minimum suppression operate level of said echo suppressor at said monitor signal frequency, supplying said test signals and said monitor signal in a predetermined format to said test circuit and to said echo suppressor, detecting said monitor signal after it has been propagated through said echo suppressor, and evaluating said detected monitor signal in accordance with preestablished test limits assigned to said monitor signal according to a characteristic of said echo suppressor being tested.

22. A method as defined in claim 21 further including the steps of first transmitting a first signal having a predetermined frequency from said remote end of said transmission paths through said first transmission path, then transmitting a second signal having a frequency the same as said first signal through the circuit path established by said first and second transmission paths, and then adjusting the gain of said test circuit so that the amplitude of a received signal traversing said first and second transmission paths is equal to the amplitude of a received signal traversing only said first transmission path thereby to minimize the affect of losses in said transmission paths upon the evaluation of said monitor signal.

* * * * *